US008743666B1

(12) United States Patent
Bertero et al.

(10) Patent No.: US 8,743,666 B1
(45) Date of Patent: Jun. 3, 2014

(54) ENERGY ASSISTED MAGNETIC RECORDING MEDIUM CAPABLE OF SUPPRESSING HIGH DC READBACK NOISE

(75) Inventors: Gerardo A. Bertero, Redwood City, CA (US); Michael Alex, Fremont, CA (US); Christopher B. Wolf, San Jose, CA (US); Eric J. Champion, San Jose, CA (US)

(73) Assignee: Western Digital Technologies, Inc., Irvine, CA (US)

( * ) Notice: Subject to any disclaimer, the term of this patent is extended or adjusted under 35 U.S.C. 154(b) by 381 days.

(21) Appl. No.: 13/042,840

(22) Filed: Mar. 8, 2011

(51) Int. Cl.
 *G11B 11/00* (2006.01)
(52) U.S. Cl.
 USPC .................. 369/13.33; 369/13.06; 369/13.49; 369/13.13
(58) Field of Classification Search
 USPC ............ 369/13.06, 13.7, 13.08, 13.09, 13.13, 369/13.33, 13.49–13.51; 360/59, 131; 428/800, 802.5, 827, 828, 831.2, 832, 428/828.1, 830
 See application file for complete search history.

(56) References Cited

U.S. PATENT DOCUMENTS

| 5,481,410 | A * | 1/1996 | Osato et al. ................. 360/13 |
| 5,512,366 | A * | 4/1996 | Nakaki et al. ............. 428/819.2 |
| 5,663,935 | A * | 9/1997 | Nishimura ................. 369/13.51 |
| 6,200,673 | B1 | 3/2001 | Miyamoto et al. |
| 6,388,956 | B1 | 5/2002 | Mori et al. |
| 6,468,670 | B1 | 10/2002 | Ikeda et al. |
| 6,495,252 | B1 | 12/2002 | Richter et al. |
| 6,551,728 | B1 | 4/2003 | Acharya et al. |
| 6,707,766 | B2 | 3/2004 | Mori et al. |
| 6,754,020 | B1 | 6/2004 | Hikosaka et al. |
| 6,834,026 | B2 | 12/2004 | Fullerton et al. |
| 6,881,497 | B2 | 4/2005 | Coffey et al. |
| 7,060,375 | B2 | 6/2006 | Lee et al. |
| 7,582,368 | B2 | 9/2009 | Berger et al. |
| 7,588,841 | B2 | 9/2009 | Berger et al. |
| 7,678,476 | B2 | 3/2010 | Weller et al. |
| 2001/0051287 | A1 | 12/2001 | Kikitsu et al. |
| 2002/0191320 | A1* | 12/2002 | Coffey et al. ................. 360/59 |
| 2007/0172705 | A1* | 7/2007 | Weller et al. ................. 428/827 |
| 2009/0040644 | A1* | 2/2009 | Lu et al. ....................... 360/59 |
| 2010/0110576 | A1* | 5/2010 | Akagi et al. ................. 360/59 |
| 2011/0235205 | A9* | 9/2011 | Lu et al. ....................... 360/59 |

FOREIGN PATENT DOCUMENTS

JP 2003085702 3/2003

OTHER PUBLICATIONS

Ferrenberg, Alan M. and D. P. Landau, "Monte Carlo study of phase transitions in ferromagnetic bilayers", Center for Simulational Physics, The University of Georgia, Athens, Georgia 30602, J. Appl. Phys., vol. 70, No. 10, Nov. 15, 1991, pp. 6215-6217.
Sasaki, J. and F. Matsubara, "Magnetic properties of mesoscopic ultrathin magnetic films with uniaxial anisotropy", J. Appl. Phys., vol. 87, No. 6, Mar. 15, 2000, pp. 3018-3022.

(Continued)

*Primary Examiner* — Tan X Dinh

(57) ABSTRACT

A perpendicular magnetic recording (PMR) disk used in energy assisted magnetic recording drives is described. The PMR disk includes a substrate, a magnetic recording layer disposed above the substrate, an exchange coupling layer disposed above the magnetic recording layer, and a capping layer disposed above the exchange coupling layer. The capping layer has a Curie temperature greater than the Curie temperature of the magnetic recording layer.

18 Claims, 5 Drawing Sheets

(56) References Cited

OTHER PUBLICATIONS

Thiele, J.-U., K. R. Coffey, M. F. Toney, J. A. Hedstrom, and A. J. Kellock, "Temperature dependent magnetic properties of highly chemically ordered Fe55-xNixPt45L10 films", J. Appl. Phys., vol. 91, No. 10, May 15, 2002, pp. 6595-6600.

Cuccoli, Allesandro, et al., "Anisotropy and Ising-type transition of the S=5/2 two-dimensional Heisenberg antiferromagnet Mn-formate di-Urea", American Institute of Physics, J. Appl. Phys., vol. 93, No. 10, Parts 2 & 3, May 15, 2003, pp. 7637-7639.

Victora, R. H., et al., "Temporal Fluctuations of Magnetic Anisotropy and their Impact on HAMR Media Noise", The Center for Micromagnetics and Information Technologies, Aug. 18, 2010, 19 pages.

\* cited by examiner

Low Granular Packing Fraction
Poor DC Noise

High Granular Packing Fraction
Good DC Noise

ENERGY ASSISTED MAGNETIC RECORDING MEDIUM CAPABLE OF SUPPRESSING HIGH DC READBACK NOISE

TECHNICAL FIELD

Embodiments described herein relate to the field of disk drives, and, in particularly, to perpendicular magnetic recording disks used in energy-assisted magnetic recording drives.

BACKGROUND

In energy-assisted magnetic recording (EAMR), the recording medium is locally heated to decrease the coercivity of the magnetic material during write operations. The local area is then rapidly cooled to retain the written information. This allows for magnetic write heads to be used with high coercivity magnetic materials. The heating of a local area may be accomplished by, for example, a heat or thermal source such as a laser. As such, one type of energy-assisted magnetic recording is heat assisted magnetic recording (HAMR). HAMR may also sometimes be referred to as thermally assisted magnetic recording (TAMR) or optically assisted magnetic recording (OAMR).

Conventional HAMR media is typically composed of a substrate, a heat sink layer, seed and nucleation layers, and a magnetic recording layer. Desirable properties of the magnetic recording layer in HAMR media include a moderate Curie temperature and a uniform, well-segregated, high magnetic anisotropy grain structure with highly developed crystallographic texture. Even with a magnetic recording layer that exhibits these properties, HAMR media may still suffer from high DC read back noise level during the read back process. The high DC read back noise level is an intrinsic characteristic of signal-layer HAMR media, and this noise level is expected to increase as the size of the reader element shrinks.

Multi-layer HAMR media structures have been explored and discussed, for example, in U.S. Pat. No. 7,678,476 B2 to Weller et al. (hereinafter "Weller"). In Weller, an HAMR media structure with a capping layer on top of the magnetic recording layer is proposed. The capping layer in Weller has a Curie temperature lower than that of the magnetic recording layer. The purpose of this capping layer in Weller is to provide magnetic stabilization to the lower magnetic recording layer at storage temperatures. This capping layer in Weller, however, does not address the high DC read back noise level during read back of the media.

BRIEF DESCRIPTION OF THE DRAWINGS

The present invention is illustrated by way of example, and not limitation, in the figures of the accompanying drawings in which.

DETAILED DESCRIPTION

In the following description, numerous specific details are set forth, such as examples of specific layer compositions and properties, to provide a thorough understanding of various embodiment of the present invention. It will be apparent, however, to one skilled in the art that these specific details need not be employed to practice various embodiments of the present invention. In other instances, well known components or methods have not been described in detail to avoid unnecessarily obscuring various embodiments of the present invention.

Embodiments of a perpendicular magnetic recording (PMR) disk for energy-assisted magnetic recording (EAMR) are described. The PMR disk structure includes a capping layer disposed above a magnetic recording layer to reduce the DC read back noise during the read back process, and an exchange coupling layer between the capping layer and the magnetic recording layer to partially exchange decouple these two layers. The addition of the capping layer also improves transition jitter on the trailing edge of the thermal spot in write operations during the refreezing process.

Figure 1:
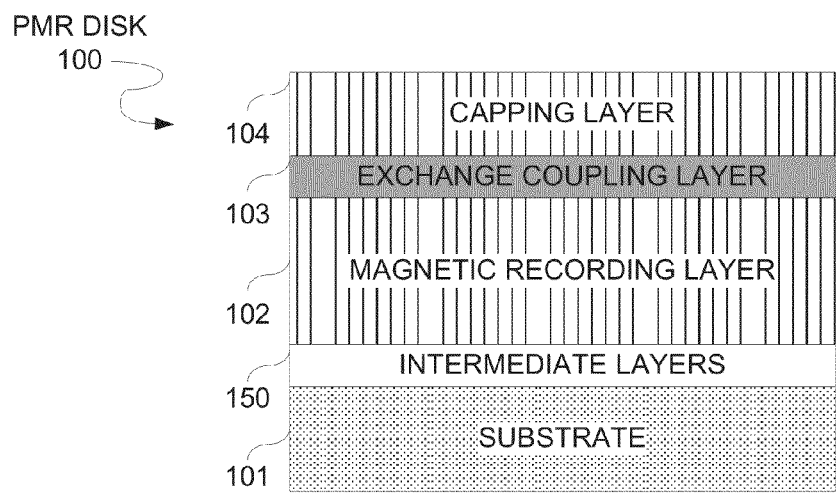
FIG. 1 illustrates a cross sectional view of a perpendicular magnetic recording (PMR) disk according to one embodiment of the present invention.

FIG. 1 illustrates a cross-sectional view of one embodiment of a PMR disk 100 to be used in an EAMR drive. The PMR disk 100 includes a capping layer 104 disposed above a magnetic recording layer 102. The material used for the capping layer 104 is selected to have a greater Curie temperature and a lower anisotropy ($K_u$) than that of the magnetic recording layer 102. The lower $K_u$ material selected for the capping layer 104 has the physical properties of reduced grain boundaries and a higher granular packing fraction than the material used in the magnetic recording layer 102. These physical properties of the capping layer 104 yield a greater intergranular lateral exchange coupling than that in magnetic recording layer 102. In one embodiment, the granular packing fraction of the lower $K_u$ material in the capping layer 104 is greater than 60%. By selecting the material used for the capping layer 104 to have a greater Curie temperature than the material used in the magnetic recording layer 102, the capping layer 104 remains magnetized during the refreezing process of write operations.

The magnetic recording layer 102 of PMR disk 100 is made of a high $K_u$ material that has a lower Curie temperature than that of the material used in the capping layer 104. In one embodiment, the high $K_u$ material selected for the magnetic recording layer 102 has the physical properties of highly segregated grain boundaries and a granular packing fraction of 60% or less. This results in a low inter-granular lateral exchange coupling between grains in the high $K_u$ material of the magnetic recording layer 102.

The PMR disk 100 further includes an exchange coupling layer 103 disposed between the magnetic recording layer 102 and the capping layer 104. One purpose of the exchange coupling layer 103 is to partially decouple the grains of the high $K_u$ material in the magnetic recording layer 102 from the grains of the low $K_u$ material in the capping layer 104 such that the higher Curie temperature of the material in the capping layer 104 does not significantly affect the Curie point of the material in the magnetic recording layer 102. Additional information and embodiments of PMR disk 100 are discussed in further detail below.

Figures 2A, 2B:
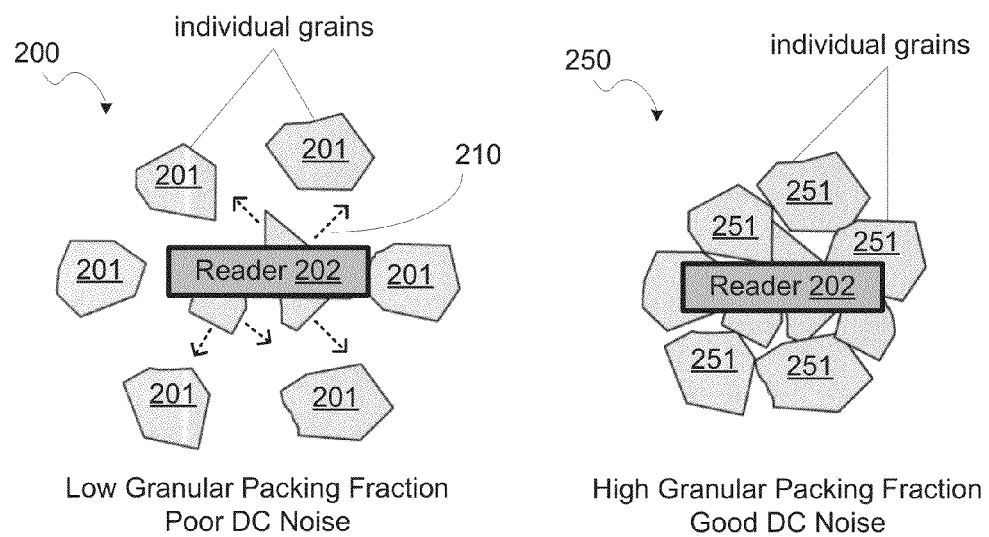
FIG. 2A illustrates the effects of a low granular packing fraction in PMR media during the read back process.
FIG. 2B illustrates the effects of a high granular packing fraction in PMR media during the read back process.

FIG. 2A illustrates the geometric effects on the read back process from a top planar view 200 of a high $K_u$ material with a low granular packing fraction in a PMR medium. In high $K_u$ material such as those selected for the magnetic recording layer 102, significant segregation of grain boundaries persists. As a result, because of the reduced integranular magnetic exchange coupling, the magnetization in individual grains 201 are given latitude to change direction more independently from that of neighboring grains. Dispersion of magnetization in media grains 201 within the reader element 202 width during the read back process can create magnetic fluctuations. These magnetic fluctuations contribute significantly to the DC read back noise of the read back signal detected by the reader element 202. If the DC read back noise is significant enough, the read back element 202 may read back erroneous information from the magnetic recording layer 102.

The presence of a capping layer 104 made of a low $K_u$ material with a high granular packing fraction disposed above the magnetic recording layer 102 reduces this DC read back noise during the read back process. In FIG. 2B, a top planar view 250 of a PMR medium with a high granular packing fraction during the read back process shows that the higher granular packing fraction limits the lateral movement of grains within the reader element 202 width. Because of the close proximity of adjacent grains in the low $K_u$ material, individual grains 251 are given less latitude to change magnetization orientation independently from its neighbors' grain. Less magnetization dispersion within the width of the reader element 202 during the read back process results in less magnetic fluctuations which, in turn, reduces the component of DC read back noise in the read back signal detected by the reader element 202. Thus, the presence of a capping layer 104 that is made of a low $K_u$ material with high granular packing fraction disposed above the magnetic recording layer 102 yields a more reliable PMR medium that is less prone to DC read back noise.

Figure 3A:
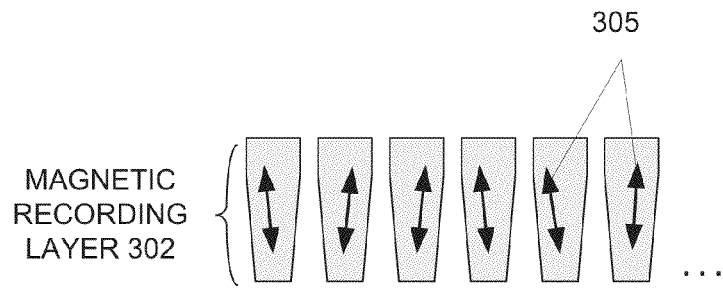
FIG. 3A illustrates the magnetic dispersion in a PMR medium without a capping layer.

In addition to reducing the DC read back noise, the low $K_u$ material used in capping layer 104 may also serve to reduce the magnetic dispersion inherent in the magnetic recording layer 102 by acting as an orientation reference to align the magnetic orientation in the grains of the magnetic recording layer 102. FIG. 3A illustrates the anisotropy axis of the magnetic orientation 305 in the grains of a magnetic recording layer 302 without a capping layer 104. Due to the segregation of gains of the high $K_u$ material used in the magnetic recording layer 102, and the inherent dispersion in the crystallographic growth orientation, the net magnetic orientation 305 may not be aligned perpendicular to the planar surface of the recording medium. This misalignment causes magnetic dispersion along the planar surface and reduces the magnitude of the read back signal level detected during the read back process.

Figure 3B:
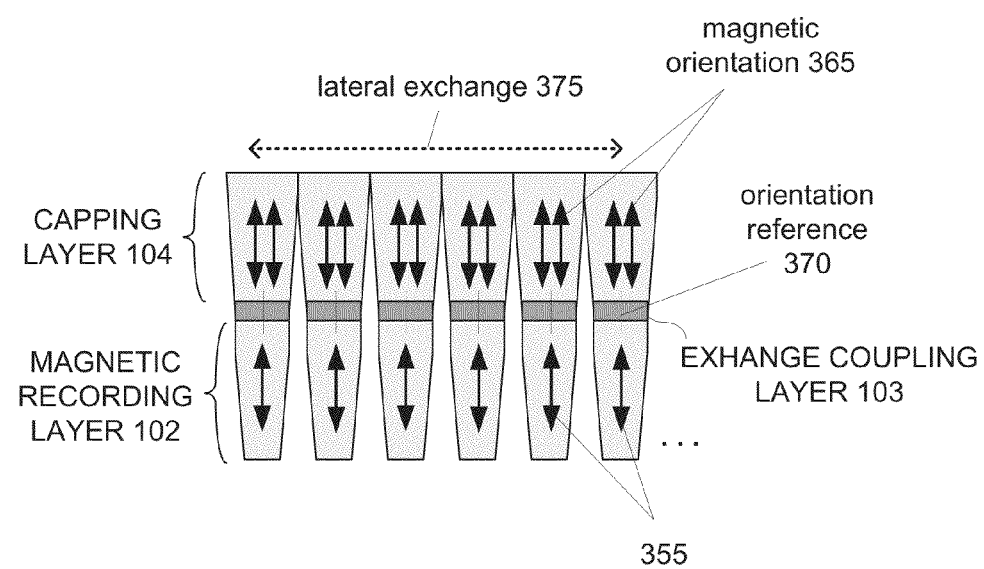
FIG. 3B illustrates the magnetic alignment in a PMR medium with a capping layer according to one embodiment of the present invention.

FIG. 3B illustrates the magnetic orientation 355 of grains in the magnetic recording layer 102 with a capping layer 104. Adjacent grains in the low $K_u$ material used in the capping layer 104 provide lateral exchange coupling 375 to one another to align the magnetic orientation 365 of grains in the capping layer 104. This magnetic alignment is then coupled through the exchange coupling layer 103 to the grains of the magnetic recording layer 102 below to provide an orientation reference 370 to improve alignment in the grains below. As a result, magnetic dispersion along the planar surface of the recording medium is reduced because the magnetic orientation 355 of grains in the magnetic recording layer 102 is more aligned perpendicular to the planar surface of the recording medium than the case without the capping layer 104. By both reducing the DC read back noise and increasing the magnitude of the detected read back signal level during the read back process, the presence of the low $K_u$ material used in capping layer 104 may yield an overall improvement in the signal-to-noise (SNR) ratio of the read back signal and provides for a higher quality PMR medium.

Figure 4:
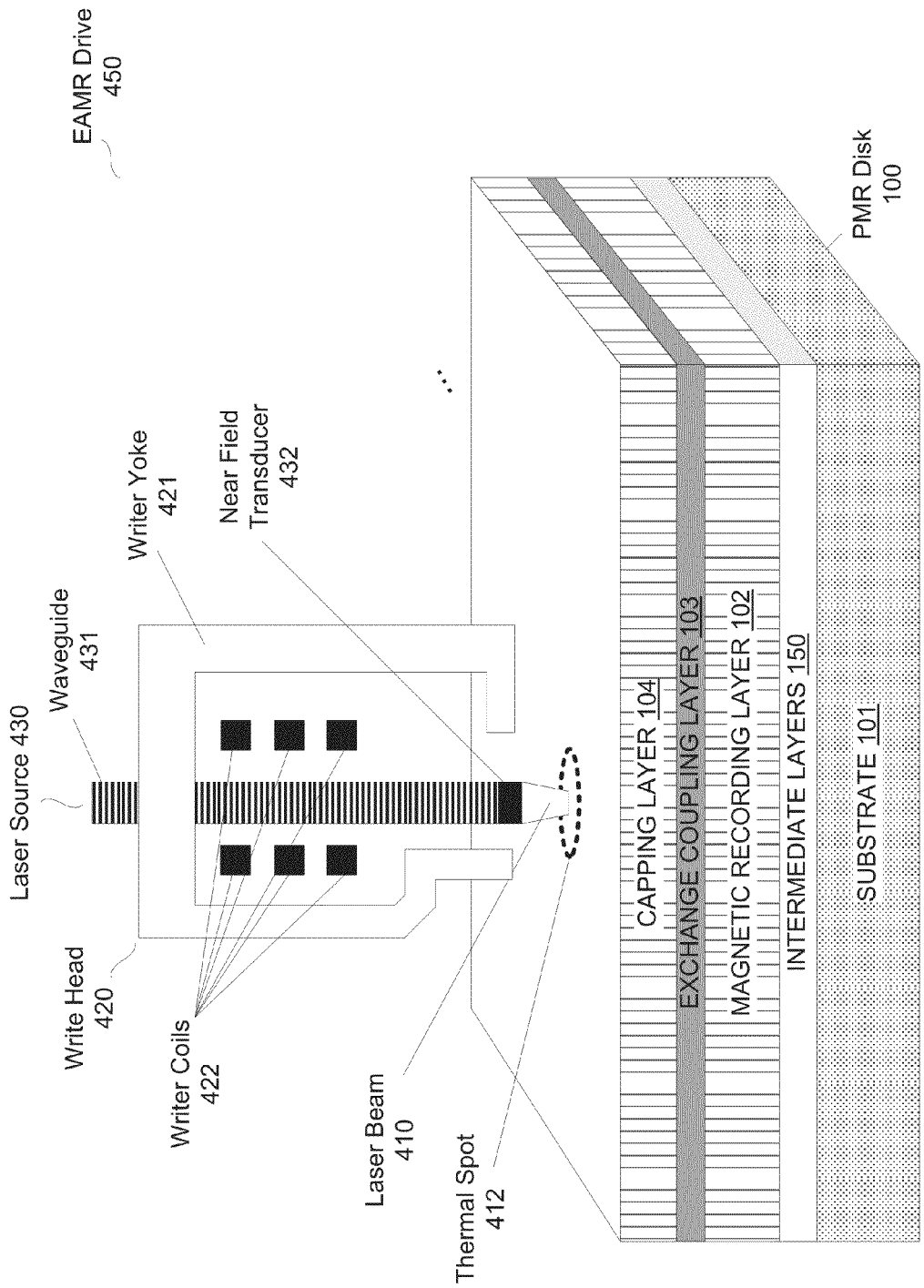
FIG. 4 illustrates a cross sectional view of a write head, a laser source, and a PMR disk in an EAMR disk drive system according to one embodiment of the present invention.

FIG. 4 illustrates an EAMR drive 450 according to one embodiment of the present invention. The EAMR drive 450 includes the components of a write head 420 (cross-sectional view shown), a laser source 430, and a PMR disk 100. The PMR disk 100 may have a substrate 101, intermediate layers 150, a magnetic recording layer 102, an exchange coupling layer 103, and a capping layer 104 made of a material selected to have a Curie temperature greater than that of the material used in the magnetic recording layer 102.

During a write operation, the laser beam 410 produces a thermal spot 412 on PMR disk 100 to heat a localized region of the magnetic recording layer 102. One of the key limiters to linear density performance of EAMR drive systems is the refreezing process on the trailing edge of the thermal spot 412. The refreezing process refers to the fixing of the magnetic orientation in the grains of the magnetic recording layer 102. During a write operation, when the magnetic recording layer 102 passes back down through its Curie point as the thermal spot 412 moves away, the randomized state of the magnetic orientation in the grains of the magnetic recording layer 102 has the potential to add to media jitter. By providing a capping layer 104 made of a material selected to have a greater Curie temperature than that of the material in the magnetic recording layer 102, the randomization of magnetic orientation in the grains of the magnetic recording layer 102 can be reduced during the refreezing process, and the linear density performance of EAMR drive systems can be improved.

Figure 5A:
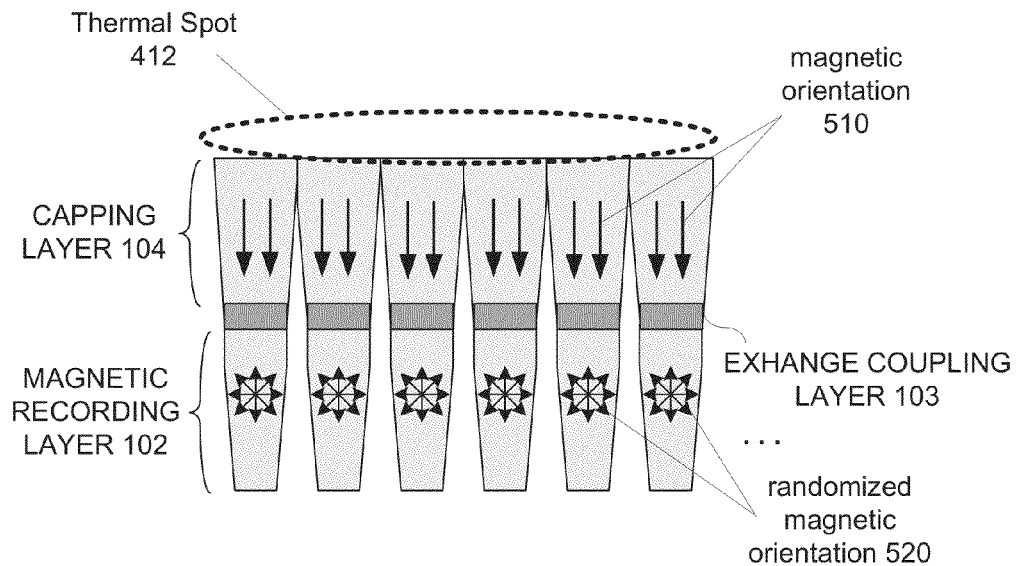
FIG. 5A illustrates the magnetic orientation of a PMR medium under a thermal spot according to one embodiment of the present invention.

In accordance with one embodiment, the thermal spot 412 may have a temperature between the Curie temperature of the material used in the magnetic recording layer 102 and the Curie temperature of the material used in the capping layer 104. In a particular embodiment, the thermal spot 412 may have a peak temperature in a range of 500 K to 900 K. The effect of the thermal spot 412 having a temperature that is between the Curie temperatures of the material used in the magnetic recording layer 102 and the material used in the capping layer 104 is shown in FIG. 5A. When a localized region of the PMR disk 100 is heated under the thermal spot 412, the grains in the capping layer 104 remains magnetized and maintains its magnetic orientation 510 because the material used in the capping layer 104 has not reached its Curie point. Meanwhile, the material in the magnetic recording layer 102, having been heated above its Curie point, is in a randomized state and has a randomized magnetic orientation 520.

Figure 5B:
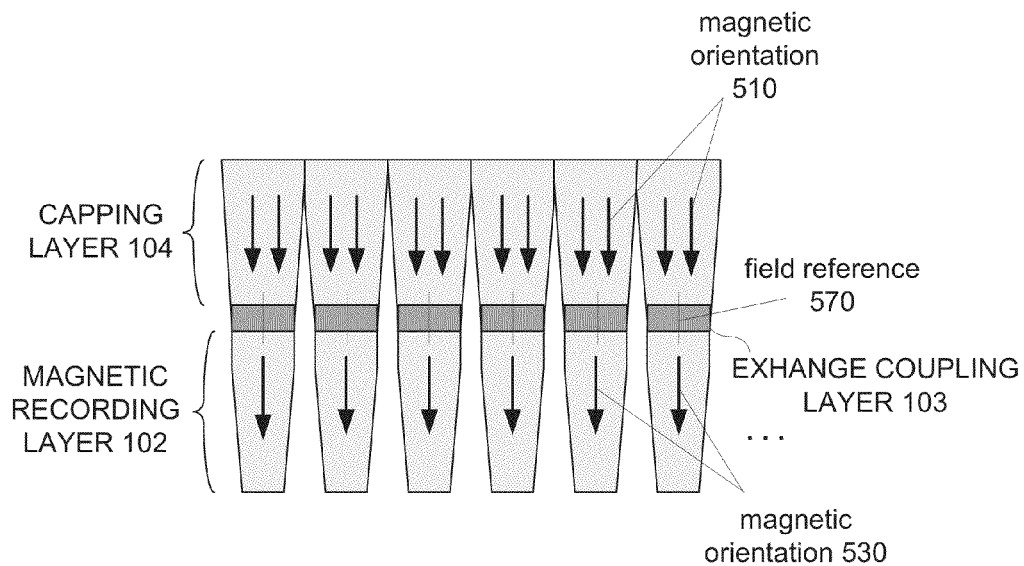
FIG. 5B illustrates the magnetic orientation of a PMR medium during the refreezing process according to one embodiment of the present invention.

As the thermal spot 412 moves away from the heated localized region, the material in the magnetic recording layer 102 is cooled back down to below its Curie point on the trailing edge of the thermal spot 412. During this refreezing process as shown in FIG. 5B, the magnetic orientation 510 of the grains in the capping layer 104 is coupled through the exchange coupling layer 103 to the grains in the magnetic recording layer 102 below. The magnetic orientation 510 in the capping layer 104 provides a field reference 570 to assist the grains in the magnetic recording layer 102 to re-align its magnetic orientation 530 parallel to an applied field. This field reference 570 provided by the capping layer 104 reduces the randomization in the magnetic orientation 530 of the grains in the magnetic recording layer 102 during the refreezing process to reduce transition jitter on the trailing edge of the thermal spot 412. By reducing the transition jitter during the refreezing process, the presence of a capping layer 104 made of a material with a higher Curie temperature than that of the material in the magnetic recording layer 102 can improve the linear density performance of EAMR drive systems.

Figure 6B:
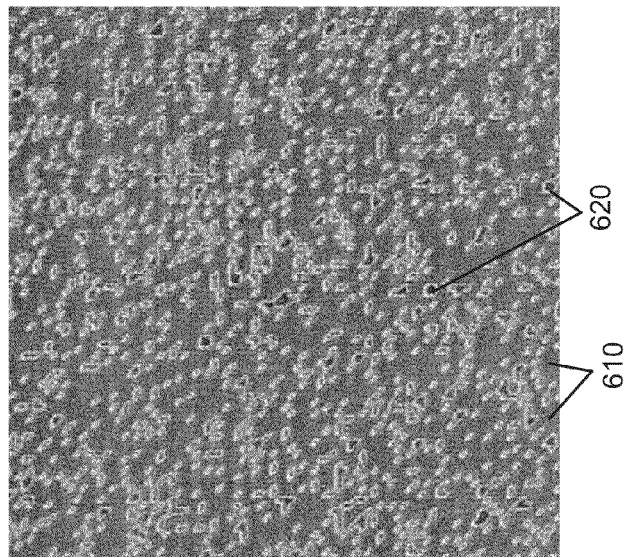
FIG. 6B illustrates simulation results with a field reference of the magnetic orientation of a PMR medium during the refreezing process according to one embodiment of the present invention.
Figure 6A:
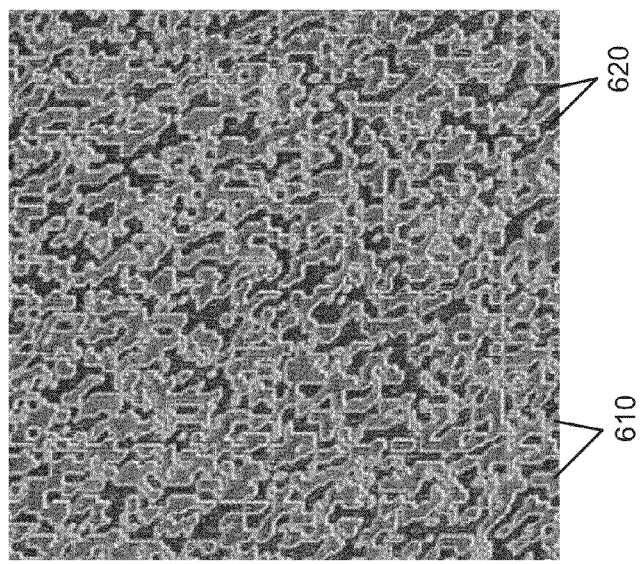
FIG. 6A illustrates simulation results with no field reference of the magnetic orientation of a PMR medium during the refreezing process.

Simulation results of the effects of a capping layer 104 made of a material with a higher Curie temperature than that of the material in the magnetic recording layer 102 during the refreezing process in a PMR medium using an Ising spin model are shown in FIG. 6A and FIG. 6B. The phase transition of the magnetic recording material during the refreezing process is a thermodynamically path dependent process and therefore depends on intermediate transition states over time. The capping layer 104 is modeled by the presence of a field reference in the simulations. FIG. 6A shows the simulation results with no field reference 600 of the magnetic alignment of a PMR recording medium during the refreezing process. Light regions 610 represent magnetic orientations that are aligned with or parallel to an externally applied field. Dark regions 620 represent magnetic orientations that are not aligned with or anti-parallel to the externally applied field. FIG. 6B shows the simulation results with a field reference representing a capping layer 650 of the magnetic alignment of a PMR recording medium at the same point in time during the refreezing process as in FIG. 6A.

As shown in FIG. 6A, the distribution of dark regions 620 is fairly even with the distribution of light regions 610 without the presence of a field reference. In contrast, the distribution of dark regions 620 in FIG. 6B is significantly less when a field reference is present. The simulation results with no field reference 600 shows that the lack of a field reference, which represents the lack of a capping layer, gives rise to a magnetic state that has higher randomization as compared to the PMR medium with a capping layer 104. In the simulation results with field reference representing a capping layer 650, the spins in the magnetic volume simulated in the PMR medium refreeze parallel to the applied external field in higher populations than that of the PMR medium that lacks such a capping layer 104. With less randomization in the magnetic orientations of the magnetic recording layer 102 during the refreezing process, transition jitter on the trailing edge of the thermal spot 412 is reduced.

Referring back to FIG. 1, additional embodiments of PMR disk 100 are as follows. The capping layer 104 of PMR disk 100 may have a thickness in the range of 1 nanometers (nm) to 12 nm. In one particular embodiment, the capping layer 104 has a thickness of 3 nm. The composition of the capping layer 104 may include one of FePt, CoPt, CoPd, CoFePd, CoCrPt, or CoCr. Alternatively, the capping layer 104 may be made of an iron-type alloy (FeX), a cobalt-platinum-type alloy (CoPtX), an iron-platinum-type alloy (FePtX), or a cobalt-type alloy (CoX), where 'X' may include one of the segregants of Ni, Cr, Co, B, C, Ag, Cu, Ru, Re, Ir, or metal or non-metal oxides.

By selecting different segregants or different combinations of segregants in the composition of the capping layer 104, the Curie temperature of the capping layer 104 may be specifically tailored because Curie temperatures are material dependent. The capping layer 104 may be made of a material that has a Curie temperature that is 20 K to 600 K greater than the Curie temperature of the material used in the magnetic recording layer 102. In one embodiment, the capping layer 104 is made of a material that has a Curie temperature that is 100 K greater than the Curie temperature of the material used in the magnetic recording layer 102. In a particular embodiment, the material used in the capping layer 104 has a Curie temperature of approximately 745 K.

In one embodiment, the magnetic recording layer 102 may have a thickness in a range of 4 to 15 nm. In a particular embodiment, the magnetic recording layer 102 has a thickness of approximately 10 nm. The magnetic recording layer 102 may be made of, for example, FePt, FePd, FePtPd, CoPt, or other ordered inter-metallic L10 alloy with a Curie temperature in the range of 500 to 800 degrees Kelvin (K). In an exemplary embodiment, the magnetic recording layer is made of FePt and has a Curie temperature of approximately 645 K. Other materials that may be used for the magnetic recording layer include ferromagnetic alloys such as FePdX, FePtPdX, or FePtX alloys, where 'X' may include one of the segregants of C, $SiO_2$, $TiO_2$, Cu, B, MgO, Ni, NiO, Cr, $Cr_2O_3$, CrO, $Al_2O_3$, Co, or CoO. In an alternative embodiment, 'X' may also include a combination of these segregants. As noted above, Curie temperatures are material dependent. Hence, the Curie temperature of the magnetic recording layer 102 may also be tailored to be less than the Curie temperature of the capping layer 104 by a specific amount, for example, 100 K, by selecting different segregants or different combinations of the segregants listed above to be used in the magnetic recording layer 102.

The exchange coupling layer 103 of PMR disk 100 may have a thickness in a range of 0.3 nm to 2 nm. In one exemplary embodiment, the exchange coupling layer 103 has a thickness of 1 nm. The exchange coupling layer 103 may be made of a variant of a ruthenium (Ru) or a ruthenium-cobalt (RuCo) alloy. The exchange coupling layer 103 may also be made of Cr, CoCr, CoCrB, MgO, TiN, TiC, Cu, Re, Pt, Pd, Ir, Ag, Ta, Nb, or V.

In another embodiment, the PMR disk 100 may also include additional or intervening layers that are not shown. The substrate 101 may be made of, for example, a metal, metal alloys such as nickel phosphorous (NiP), glass, or other substrate materials known in the art including polymers and ceramics. The intermediate layers 150 disposed above the substrate 101 may include a heat sink layer. The heat sink layer may be made of copper (Cu). Other metals or heat conductive materials may be also used for the heat sink layer. In addition, the intermediate layers 150 may also include an underlayer, a seed layer made of, for example, tantalum (Ta), and nucleation layers made from one of, for example, Ta, chromium ruthenium (CrRu), or magnesium oxide (MgO). In an alternative embodiment, the intermediate layers 150 may have other compositions and additional intervening layers.

Referring back to FIG. 4, the EAMR drive 450 in the above description may be a heat assisted magnetic recording (HAMR) drive. HAMR may also sometimes be referred to as thermally assisted magnetic recording (TAMR) or optically assisted magnetic recording (OAMR). The write head 420 may include a writer yoke 421 and writer coils 422. The components of the laser source 430 may include a waveguide 431 and a near-field transducer (NFT) 432. Techniques in generating a laser beam 410 and focusing the laser beam 410 with NFT 432 are known in the art, and thus, are not described in particular details. In another embodiment, alternative energy sources may be used in place of laser source 430, and other energy beams from other energy sources may be used to produce the thermal spot 412.

It should be noted that the apparatus and methods discussed herein may be used with various types of drives. In one embodiment, for example, the apparatus and methods discussed herein may be used with a non-EAMR disk drive such as a PMR drive with inductive write heads.

The terms "above," "under," and "between" and "on" as used herein refer to a relative position of one media layer with respect to other layers. As such, for example, one layer disposed above or under another layer may be directly in contact with the other layer or may have one or more intervening layers. Moreover, one layer disposed between two layers may be directly in contact with the two layers or may have one or more intervening layers. In contrast, a first layer "on" a second layer is in direct contact with that second layer. Additionally, the relative position of one layer with respect to other layers is provided assuming operations are performed relative to a substrate without consideration of the absolute orientation of the substrate.

In the foregoing specification, the present invention has been described with reference to specific exemplary embodiments thereof. It will, however, be evident that various modifications and changes may be made thereto without departing from the broader scope of the embodiments of the invention as set for in the appended claims. The specification and drawings are, accordingly, to be regarded in an illustrative rather than a restrictive sense.

What is claimed is:

1. A perpendicular magnetic recording (PMR) disk, comprising:
    a substrate;
    a magnetic recording layer disposed above the substrate, wherein the magnetic recording layer has a first Curie temperature;
    an exchange coupling layer disposed above the magnetic recording layer; and
    a capping layer disposed above the exchange coupling layer, wherein the capping layer has a second Curie temperature being greater than the first Curie temperature of the magnetic recording layer, wherein the capping layer remains magnetized during a refreezing process of a write operation.

2. The perpendicular magnetic recording disk of claim 1, wherein the magnetic recording layer has a first magnetic anisotropy, the capping layer has a second magnetic anisotropy being less than the first magnetic anisotropy of the magnetic recording layer.

3. The perpendicular magnetic recording disk of claim 1, the magnetic recording layer has a first lateral exchange coupling, the capping layer has a second lateral exchange coupling being greater than the first lateral exchange coupling of the magnetic recording layer.

4. The perpendicular magnetic recording disk of claim 1, wherein the magnetic recording layer has a first packing fraction, the capping layer has a second packing fraction being greater than the first packing fraction of the magnetic recording layer.

5. The perpendicular magnetic recording disk of claim 1, wherein the first Curie temperature is in a range of 500 degrees Kelvin to 800 degrees Kelvin.

6. The perpendicular magnetic recording disk of claim 5, wherein the second Curie temperature is greater than the first Curie temperature by an amount being in a range of 20 degrees Kelvin to 600 degrees Kelvin.

7. The perpendicular magnetic recording disk of claim 6, wherein the first Curie temperature is approximately 645 degrees Kelvin and the second Curie temperature is approximately 745 degrees Kelvin.

8. The perpendicular magnetic recording disk of claim 4, wherein the second packing fraction is greater than 60%.

9. The perpendicular magnetic recording disk of claim 1, wherein the capping layer has a thickness in a range of 1 nanometer (nm) to 12 nm.

10. The perpendicular magnetic recording disk of claim 9, wherein the exchange coupling layer has a thickness in a range of 0.3 nm to 2 nm.

11. The perpendicular magnetic recording disk of claim 1, wherein magnetic recording layer comprises an ordered intermetallic L10 alloy.

12. The perpendicular magnetic recording disk of claim 1, wherein the exchange coupling layer comprises a ruthenium (Ru) or a cobalt-ruthenium (RuCo) alloy.

13. The perpendicular magnetic recording disk of claim 1, wherein the capping layer comprises an iron-type alloy (FeX), a cobalt-platinum-type alloy (CoPtX), an iron-platinum-type alloy (FePtX), or a cobalt-type alloy (CoX).

14. An energy assisted magnetic recording (EAMR) drive, comprising:
    a perpendicular magnetic recording (PMR) disk comprising:
        a substrate;
        a magnetic recording layer disposed above the substrate, the magnetic recording layer having a first Curie temperature;
        an exchange coupling layer disposed above the magnetic recording layer; and
        a capping layer disposed above the exchange coupling layer, the capping layer having a second Curie temperature being greater than the first Curie temperature of the magnetic recording layer, wherein the capping layer remains magnetized during a refreezing process of a write operation; and
    an energy source to generate a thermal spot on the PMR disk.

15. The EAMR drive of claim 14, wherein the EAMR drive is a heat assisted magnetic recording (HAMR) drive.

16. The EAMR drive of claim 14, wherein the second Curie temperature is greater than the first Curie temperature in a range of 20 degrees Kelvin to 600 degrees Kelvin.

17. The EAMR drive of claim 16, wherein the thermal spot has a peak temperature in a range of 500 degrees Kelvin to 900 degrees Kelvin.

18. The EAMR drive of claim 17, wherein the capping layer remains magnetized in response to the thermal spot to provide a field reference to the magnetic recording layer.

* * * * *